UNITED STATES PATENT OFFICE.

HEINRICH JORDAN AND WILHELM NEELMEIER, OF LEVERKUSEN, NEAR COLOGNE, GERMANY, ASSIGNORS TO FARBENFABRIKEN VORM. FRIEDR. BAYER & CO., OF ELBERFELD, GERMANY, A CORPORATION OF GERMANY.

AZO DYE.

1,024,081.  Specification of Letters Patent. Patented Apr. 23, 1912.

No Drawing.   Application filed November 10, 1911. Serial No. 659,572.

*To all whom it may concern:*

Be it known that we, HEINRICH JORDAN and WILHELM NEELMEIER, doctors of philosophy, chemists, citizens of the German Empire, residing at Leverkusen, near Cologne, Germany, have invented new and useful Improvements in New Azo Dye, of which the following is a specification.

Green substantive dyestuffs capable of further diazotization have hitherto not been obtained, though they would be of great technical value as an addition to the number of coloring matters of such character already known or of modifying the shades produced from the latter. We have now succeeded in preparing dyes of this character capable of dyeing cotton in green to greenish-blue shades. The process for their production consists in combining diazo compounds of acidyl-para-diamins, such as acidyl-para-phenylenediamins, acidyl-1.4-naphthylenediamins with a suitable middle component which can be further diazotized after the combination. The aminoazo compounds thus obtained are again diazotized and combined with 2-amino-8-naphthol-6-sulfonic acid; the resulting aminodisazo coloring matters are diazotized, coupled with methylketol (alpha-methylindol) and the trisazo dyestuffs thus obtained are finally saponified. The same results are obtained on using in this process instead of acidyl-para-phenylenediamins or of acidyl-1.4-naphthylenediamins or of derivatives of these compounds the corresponding nitroamino compounds and on finally reducing the nitro group contained in the trisazo dyestuffs, instead of eliminating the acidyl group contained in the trisazo dyestuffs if prepared as before described.

The new dyestuffs are after being dried in the shape of their alkaline salts dark powders soluble in water. Upon reduction with stannous chlorid and hydrochloric acid they yield a para-diamin, a diamin, 2.7-diamino-8-oxynaphthalene-6-sulfonic acid and amino-methylketol. They die cotton in green to greenish-blue shades, which on being diazotized and developed on the fiber e. g. with beta-naphthol produce dyeings very fast to washing and to light, and capable of being discharged with hydrosulfite to a very pure white.

In order to illustrate the new process more fully the following example is given, the parts being by weight:—280 parts of 1-acetylamino-4-aminonaphthalene-6-sulfonic acid are dissolved in 7000 parts of water and 55 parts of soda. The solution is acidulated with 280 parts of hydrochloric acid and diazotized with 69 parts of sodium nitrite at from 15 to 20° C. The diazo compound is combined with a solution of 245 parts of the sodium salt of 1.6-naphthylamin sulfonic acid containing 250 parts of sodium acetate. The combination is finished after stirring for a short time. The solution is then acidulated with 700 parts of hydrochloric acid of 19° Bé. and diazotized with 69 parts of sodium nitrite at from 10 to 15° C. After stirring for about 1 hour the diazotization is complete and the diazo compound is allowed to run into a solution of 261 parts of the sodium salt of 2-amino-8-naphthol-6-sulfonic acid and 800 parts of soda. The coupling is soon finished. The disazo dyestuffs is separated by the addition of salt and filtered off. It is well mixed with 7000 parts of water; 600 parts of hydrochloric acid are added to the paste and the mixture is cooled to 0° and diazotized with 69 parts of sodium nitrite. It is stirred until the nitrite reaction has disappeared. A solution of 131 parts of methylketol in 280 parts of hydrochloric acid (19° Bé.) is allowed to run slowly into the diazo compound produced from the intermediate product. After one hour's stirring the solution is heated at 30 to 40° C. and the stirring continued at this temperature for 2 hours and the dyestuff after being salted out is filtered off. The paste is well mixed with 3000 parts of water and 200–300 parts of soda in order to render the mixture throughout alkaline. It is then heated to boiling and 1400 parts of soda lye (30 per cent. NaOH) are added. The boiling is continued for 10 minutes, the mixture is afterward stirred for 15 minutes at 90–95° C., then cooled to from 60–70° C. acidulated to neutralize the excess of the soda lye and the separated dyestuff is filtered off.

The new dye thus obtained having probably the following formula:

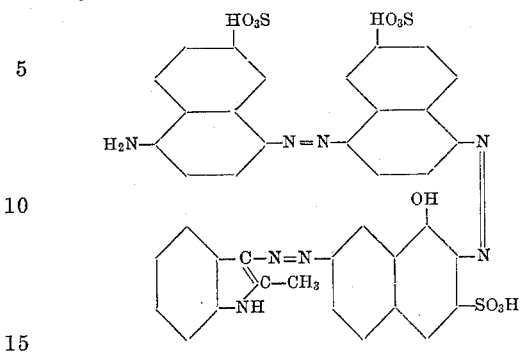

is after being dried and pulverized in the shape of its sodium salt a dark powder. It dissolves in water with a pure green color and dyes cotton directly in green shades, which when diazotized and developed with beta-naphthol turn into slightly bluer shades of excellent fastness to washing and to light. Upon reduction with stannous chlorid and hydrochloric acid it is split up into 1.4-naphthylenediamin-6-sulfonic acid, 2.7-diamino-8-oxynaphthalene-6-sulfonic acid and aminomethylketol.

We claim:—

1. The herein described new dyestuffs which are after being dried and pulverized in the shape of their alkaline salts dark powders soluble in water; yielding upon reduction with stannous chlorid and hydrochloric acid a para-diamin, a diamin, 2.7-diamino-8-oxynaphthalene-6-sulfonic acid and aminomethylketol; dyeing cotton in green to greenish-blue shades, which on being diazotized and developed on the fiber with beta-naphthol produce dyeings very fast to washing and to light and capable of being discharged with hydrosulfite to a very pure white, substantially as described.

2. The herein described new dyestuff which is after being dried and pulverized in the shape of its sodium salt a dark powder soluble in water with a pure green color; yielding upon reduction with stannous chlorid and hydrochloric acid 1.4-naphthylenediamin-6-sulfonic acid, 2.7-diamino-8-oxynaphthalene-6-sulfonic acid and aminomethylketol; dyeing cotton directly in green shades, which when diazotized and developed with beta-naphthol turn into slightly bluer shades of excellent fastness to washing and to light and capable of being discharged with hydrosulfite to a very pure white, substantially as described.

In testimony whereof we have hereunto set our hands in the presence of two subscribing witnesses.

HEINRICH JORDAN. [L. S.]
WILHELM NEELMEIER. [L. S.]

Witnesses:
ALBERT NUFER,
HELEN NUFER.